United States Patent [19]

Nossen

[11] 4,306,308
[45] Dec. 15, 1981

[54] SYMBOLS COMMUNICATION SYSTEM

[75] Inventor: Edward J. Nossen, Cherry Hill, N.J.

[73] Assignee: RCA Corporation, New York, N.Y.

[21] Appl. No.: 94,280

[22] Filed: Nov. 14, 1979

Related U.S. Application Data

[63] Continuation-in-part of Ser. No. 75,716, Sep. 14, 1979.

[51] Int. Cl.³ .................................... H04L 27/10
[52] U.S. Cl. .......................... 375/48; 340/825.75; 375/113; 375/115
[58] Field of Search .............. 179/2 DP; 370/47, 106, 370/105, 49; 340/171 R, 171 A, 171 PF; 375/1, 2, 44, 45, 48, 106, 113, 114, 115; 340/146.3 WD; 455/36

[56] References Cited

U.S. PATENT DOCUMENTS

| | | | |
|---|---|---|---|
| 2,771,545 | 11/1956 | Doelz | 179/2 DP |
| 3,579,110 | 5/1971 | Hauber | 375/48 |
| 3,582,895 | 6/1971 | Abramson et al. | 340/171 PF |
| 3,715,726 | 2/1973 | Wallin et al. | 340/171 PF |
| 3,810,019 | 5/1974 | Miller | 340/171 PF |
| 3,944,742 | 3/1976 | Cunningham | 375/45 |
| 3,990,071 | 11/1976 | Ito et al. | 340/171 PF |
| 4,011,511 | 3/1977 | Chang | 375/48 |
| 4,020,449 | 4/1977 | Ito et al. | 340/171 PF |
| 4,114,142 | 9/1978 | Wycoff et al. | 340/171 PF |

Primary Examiner—Benedict V. Safourek
Attorney, Agent, or Firm—Samuel Cohen; Robert L. Troike; Donald W. Phillion

[57] ABSTRACT

A data communications system for transmitting and receiving 64 different audio-frequency signals representing 64 respective alpha-numeric code symbols. A synchronizing signal consists of three time-spaced bursts where each burst consists of three audio-frequency signals. A following information signal consists of a three time-spaced message bursts where each burst consists of twenty audio-frequency signals, all three of the message bursts containing the same audio-frequency signals but in different orders. A receiver includes synchronizer means to recognize the predetermined synchronizing signal, and decoder means enabled and synchronized by the synchronizer means to decode the information signal. The audio-frequency signals may be 64 different fixed-frequency tones, or may be 64 differently-changing signals such as may be produced by unidirectional phase shift keying by 64 different pseudo-random number codes.

17 Claims, 12 Drawing Figures

EXECUTIVE PROGRAM FLOW CHART

Fig.9

SYNC FLOW CHART

Fig.10

MODULATOR

SYMBOLS COMMUNICATION SYSTEM

This application is a continuation-in-part of application Ser. No. 075,716 filed on Sept. 14, 1979, on a "Multiple Frequency Communication System."

This invention relates to a data communications system which is highly reliable under adverse conditions of noise, interference and signal fading, and which employs a different audio-frequency signal for each respective alpha-numeric character or symbol.

According to a specific example illustrative of the invention, highly reliable data communication is provided by a system in which 64 alpha-numeric symbols are represented by 64 different fixed frequencies in the audio-frequency range. A message starts with a synchronizing signal of 9 predetermined symbols arranged in 3 bursts of 3 symbols each. The following message information consists of 20 symbols in a first message burst, the same 20 symbols in a scrambled order in a second message burst, and the same 20 symbols in another scrambled order in a third message burst.

According to another specific example, the 64 alpha-numeric symbols are represented by 64 differently-modulated audio-frequency signals. The 64 signals may be produced by unidirectional phase shift keying by 64 different respective pseudo-random numbers.

Figure 1:
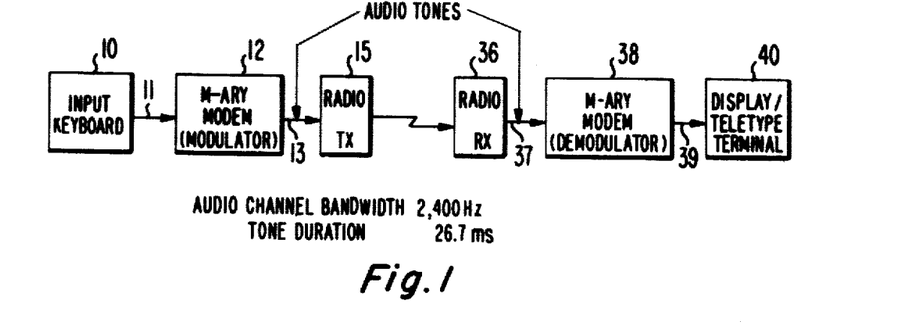
FIG. 1 is a diagram of a communication system for transmitting and receiving messages consisting of twenty characters per message, where each character is one of sixty-four alpha-numeric symbols, represented by sixty-four respective fixed audio frequencies.

In the overall system shown in FIG. 1, message data in the form of 6-bit characters or symbols are supplied by a computer or an input terminal keyboard 10 to a modulator 12 which translates each one of 64 6-bit symbols to a respective audio tone in the range between 300 Hz and 2662.5 Hz. The modulator is called an M-ary modulator where M equals 64. The 64 symbols, the corresponding 6-bit codes, and the corresponding audio frequencies for one particular system are given in Table I below.

TABLE I

CHARACTER TO FREQUENCY MAPPING

| ORDER | CHARACTER | FREQUENCY (Hz) | ORDER | CHARACTER | FREQUENCY (Hz) | ORDER | CHARACTER | FREQUENCY (Hz) |
|---|---|---|---|---|---|---|---|---|
| 0 | @ | 300 | 23 | W | 1162.5 | 46 | . | 2025 |
| 1 | A | 337.5 | 24 | X | 1200 | 47 | / | 2062.5 |
| 2 | B | 375 | 25 | Y | 1237.5 | 48 | 0 | 2100 |
| 3 | C | 412.5 | 26 | Z | 1275 | 49 | 1 | 2137.5 |
| 4 | D | 450 | 27 | [ | 1312.5 | 50 | 2 | 2175 |
| 5 | E | 487.5 | 28 | \ | 1350 | 51 | 3 | 2212.5 |
| 6 | F | 525 | 29 | ] | 1387.5 | 52 | 4 | 2250 |
| 7 | G | 562.5 | 30 | ↑ | 1425 | 53 | 5 | 2287.5 |
| 8 | H | 600 | 31 | ← | 1462.5 | 54 | 6 | 2325 |
| 9 | I | 635.5 | 32 | SPACE | 1500 | 55 | 7 | 2362.5 |
| 10 | J | 675 | 33 | ! | 1537.5 | 56 | 8 | 2400 |
| 11 | K | 712.5 | 34 | " | 1575 | 57 | 9 | 2437.5 |
| 12 | L | 750 | 35 | # | 1612.5 | 58 | : | 2475 |
| 13 | M | 787.5 | 36 | $ | 1650 | 59 | ; | 2512.5 |
| 14 | N | 825 | 37 | % | 1687.5 | 60 | < | 2550 |
| 15 | O | 862.5 | 38 | & | 1725 | 61 | = | 2587.5 |
| 16 | P | 900 | 39 | ' | 1762.5 | 62 | > | 2625 |
| 17 | Q | 937.5 | 40 | ( | 1800 | 63 | ? | 2662.5 |
| 18 | R | 975 | 41 | ) | 1837.5 | | | |
| 19 | S | 1012.5 | 42 | * | 1875 | | | |
| 20 | T | 1050 | 43 | + | 1912.5 | | | |
| 21 | U | 1087.5 | 44 | , | 1950 | | | |
| 22 | V | 1125 | 45 | — | 1987.5 | | | |

Figure 2:
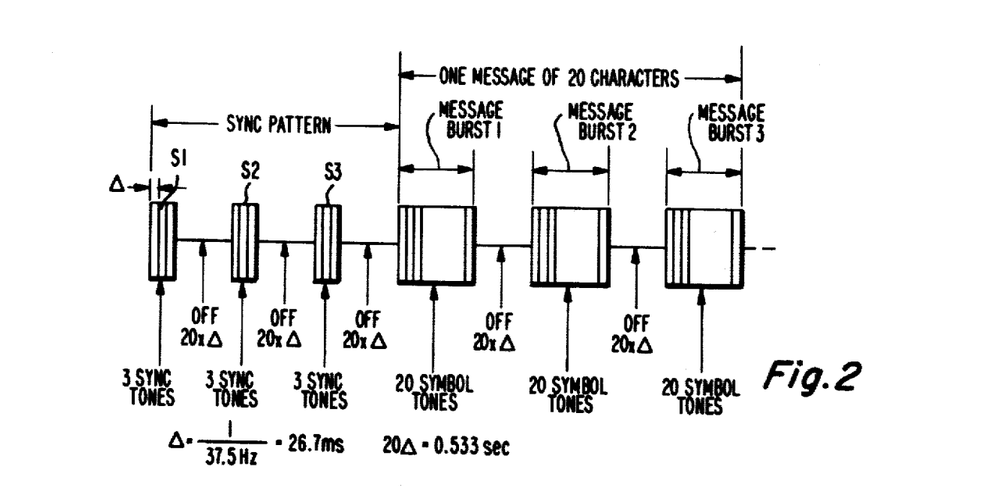
FIG. 2 is a diagram showing the coding pattern of a twenty-symbol message including a synchronizing pattern of three sync bursts of three symbols each followed by three message bursts of twenty symbols each.

The modulator 12 of FIG. 1 translates a 20-symbol message into a signal pattern shown in FIG. 2 to include a sync pattern of nine symbol tones in three time-spaced bursts of three tones each, followed by a message pattern of three bursts of twenty symbol tones each. Each tone has a duration Δ of 26.7 milliseconds which is equal to the period of one cycle at 37.5 Hz. The periods between sync bursts and message bursts is 20Δ or 0.533 seconds.

Figure 3:
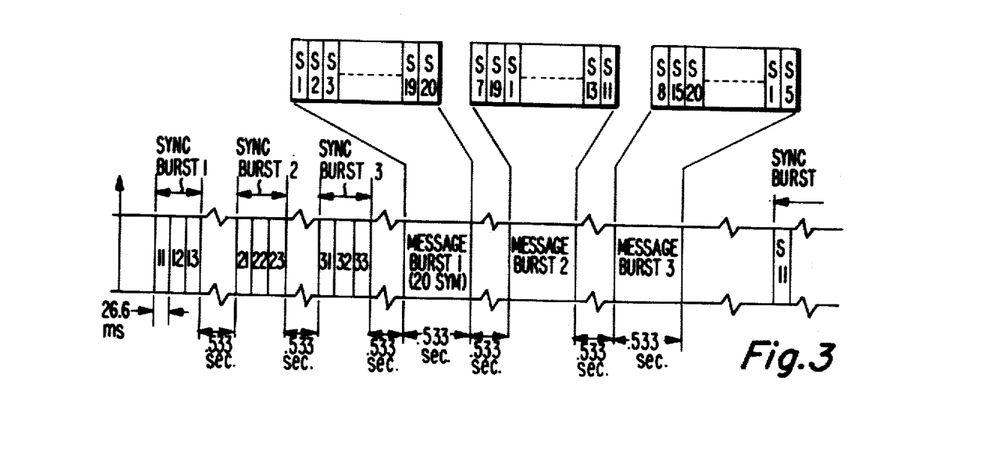
FIG. 3 is a diagram of the coding pattern showing an example of the symbols used in the sync bursts, and the scrambled arrangement of the symbols in the three redundant twenty-symbol message bursts.

An example of symbols used for sync tones and message tones is given in FIG. 3 where the sync bursts consist of nine tones 11, 12, 13 and 21, 22, 23, and 31, 32, 33 all different. The sync tones may constitute the address code of an intended recipient of the message. The three message bursts each contain the tones corresponding with the same twenty symbols, but the order of the symbols in the three message bursts may be altered in pseudo-random fashion, as shown by an example given in Table II.

TABLE II
MESSAGE SYMBOL SEQUENCE

| Received Order | Symbol Number in the 20 Character Message | | |
|---|---|---|---|
| | Message Burst 1 | Message Burst 2 | Message Burst 3 |
| 1 | First 1 | 19 | 17 |
| 2 | 3 | 13 | 3 |
| 3 | 5 | 7 | 9 |
| 4 | 7 | 1 | 15 |
| 5 | 9 | 15 | 1 |
| 6 | 11 | 9 | 7 |
| 7 | 13 | 3 | 13 |
| 8 | 15 | 17 | 19 |
| 9 | 17 | 11 | 5 |
| 10 | 19 | 5 | 11 |
| 11 | 2 | 20 | 18 |
| 12 | 4 | 14 | 4 |
| 13 | 6 | 8 | 10 |
| 14 | 8 | 2 | 16 |
| 15 | 10 | 16 | 2 |
| 16 | 12 | 10 | 8 |
| 17 | 14 | 4 | 14 |
| 18 | 16 | 18 | 20 |
| 19 | 18 | 12 | 6 |
| 20 | 20 | 6 | 12 Last |

Figure 4:
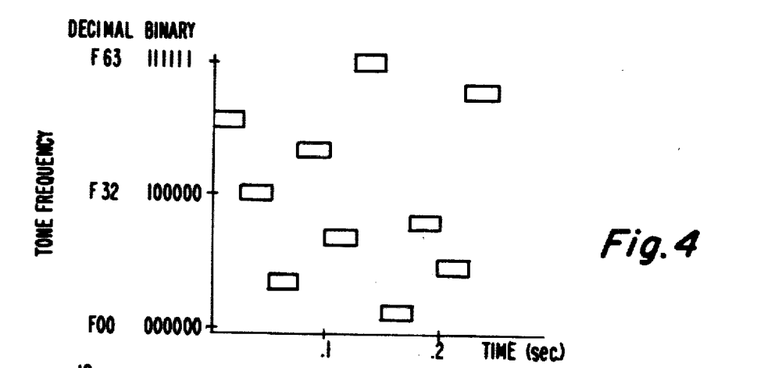
FIG. 4 is a diagram of tone frequency vs. time showing a time sequence of tones each representing a respective symbol.

In the message structure shown in FIGS. 2 and 3, the sync has nine times diversity and the message has only triple diversity. Consequently, the sync is more reliable than the message, as it should be. The 20-symbol gap between sync and message bursts is included for the sake of time diversity. The message length was arbitrarily selected to be 20 characters, and can be more or less if desired. FIG. 4 illustrates the sequential occurrence of different tones representing different respective ones of the 64 symbols.

An additional form of diversity called "inband frequency diversity" can be employed to provide a power advantage with respect to continuous-wave (CW) interference. Inband frequency diversity may be accomplished by making a symbol in the second and third message bursts have order numbers (Table II) which has 20 higher and 40 higher, respectively, than it has in the first burst. For values which overflow 63, the count continues from zero so that all symbols are in the range 0 through 63 and within the audio frequency band from 330 Hz to 2,662.5 Hz.

Figure 5:
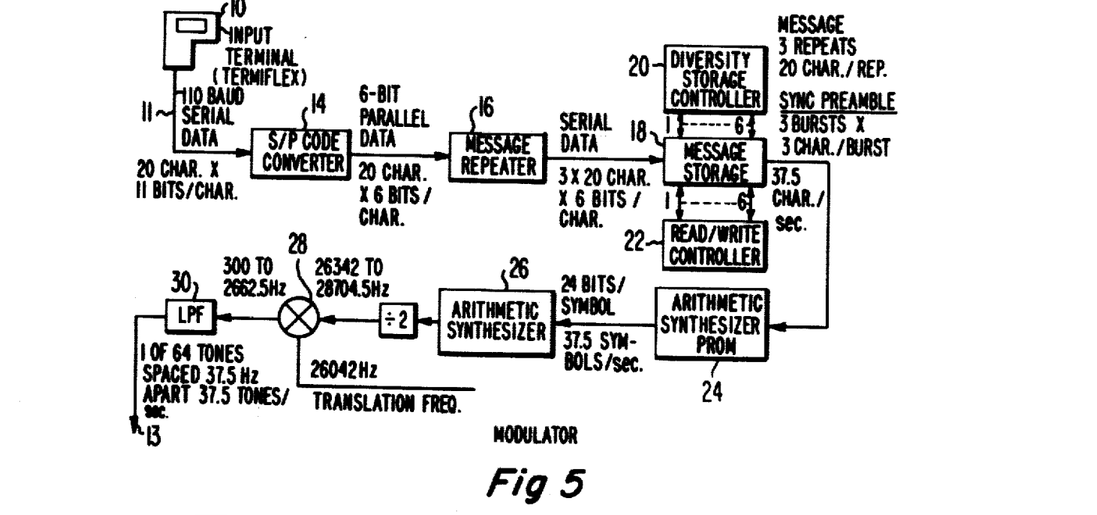
FIG. 5 is a diagram of a 64-tone modulator useful in the system of FIG. 1.

FIG. 5 is a block diagram of the M-ary modem modulator. Data is supplied via a keyboard. The modem produces a baseband multiple frequency shift keyed (MFSK) signal occupying the frequency band from 300 to 2662.5 Hz. The transmitter input terminal 10 is a commercially available Termi-flex HD-2 keyboard capable of producing the full ASCII character set of 128 characters (though only 64 are used for the M-ary system). Other equivalent keyboards may be substituted. The keyboard output is an asynchronous serial bit stream at a 110 baud maximum data rate (10 characters/second).

The serial bit stream from the keyboard is loaded into a serial/parallel code converter 14. The 6 least-significant data bits from each character are retained and shifted in parallel to a message repeater 16. Each 6-bit character is triplicated and serially shifted into a message storage buffer 18. The character storage locations are determined by a diversity storage controller 20 so as to produce the triplicated, scrambled message structure. When all 20 input characters are processed and the message storage buffer 18 is filled, a read/write controller 22 generates the sync preamble and causes the preamble and message characters to be shifted into an arithmetic synthesizer programmable read-only memory (PROM) 24 at a 37.5 char./sec rate. The PROM 24 converts each 6-bit character code to a 24-bit arithmetic synthesizer code word which is converted in a synthesizer 26 to a frequency between 52684 Hz and 57409 Hz. The synthesizer output is divided by two and mixed at 28 with a 26042 Hz translation frequency to produce the appropriate symbol frequency in the 300 to 2662.5 Hz range passed by a low-pass filter 30 over line 13 to a radio transmitter 15 shown in FIG. 1.

The arithmetic synthesizer may be of any well-known construction following the principles described in U.S. Pat. No. 3,689,914 issued on Sept. 5, 1972, to J. G. Butler on a "Waveform Generator."

In the operation of the modulator of FIG. 5, twenty message characters are supplied in bit serial form by the input terminal 10. The message characters are converted to 6-bit-parallel, character-serial, form at 14, and the message is repeated three times at 16 because the transmitted message is to include three bursts of twenty symbols each, as shown in FIGS. 2 and 3. As the three-times repeated twenty-symbol message is fed to the message storage memory 18, the diversity storage controller 20 selects storage locations for the symbols in accordance with a diversity scheme such as is set out in Table II. The first column gives the order of the symbols in the message. The following columns give the orders of the message symbols when read out of the memory 18. But, before the three message bursts are read out from the memory, the controller 22 causes nine sync symbols to be read out from the memory, in bursts of three symbols each, so that the entire sync and message pattern read out from the memory is as shown in FIGS. 2 and 3.

The sequence of 6-bit characters or symbols from memory 18 are translated by the combination of memory unit 24, and arithmetic synthesizer unit 26 to corresponding analog frequencies, which after being heterodyned down in frequency, are corresponding analog audio-frequency tones having frequencies as listed in Table I. The sync symbols and message symbols at the output 13 of low pass filter 30 are in the form of audio tones suitable for transmission by any radio normally used for voice signals.

Figure 6:
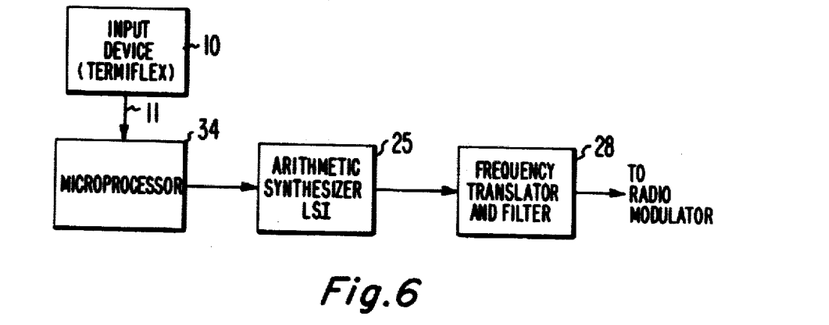
FIG. 6 is a diagram of an alternative 64-tone modulator useful in the system of FIG. 1.

FIG. 6 shows an alternative construction for the modulator 12 of FIG. 1. Message characters are supplied from input device 10 to a microprocessor 34 having a program which formats the message characters with sync characters, in accordance with the pattern of FIGS. 2 and 3. The formatted digital characters from the microprocessor are applied to an arithmetic synthesizer integrated circuit unit 25 which translates the digital characters to corresponding analog frequencies. The frequency translator 28 changes the signals to corresponding low distortion analog audio tones in the range from 300 Hz to 2662.5 Hz for application to the radio transmitter 15 in FIG. 1.

The signal-receiving half of the system shown in FIG. 1 includes a radio receiver 36, and demodulator 38 and a display device 40 such as a teletype machine. The demodulator 38 translates the received tones to corresponding digital signals, recognizes the sync characters of a message, determines the most probably correct twenty characters in the three redundant message bursts, and displays them on the output terminal.

Figure 7:
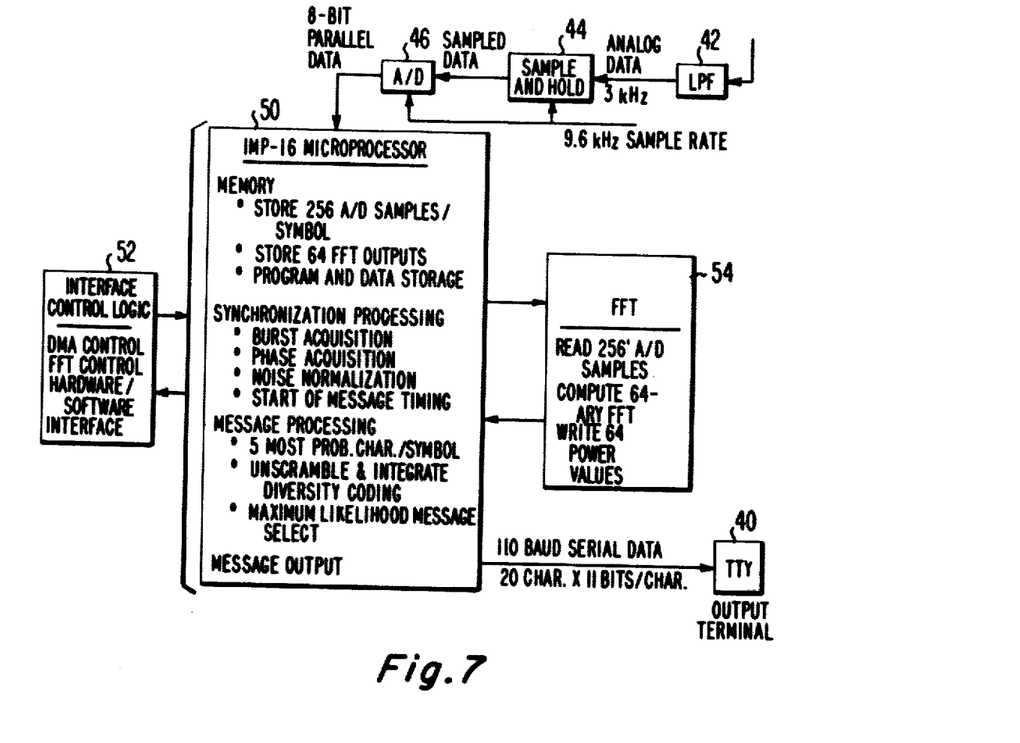
FIG. 7 is a diagram of a 64-tone demodulator useful in the system of FIG. 1.

FIG. 7 shows a demodulator which includes a low pass filter 42, a sample-and-hold circuit 44 and an analog-to-digital converter 46, by which the received audio-frequency tones are translated to corresponding eight-bit words representing samples taken at a 9.6 kHz rate of the received tones. The binary samples of received characters are fed to the memory of a microprocessor 50 controlled by an interface control logic 52. The microprocessor may be an IMP-16 unit manufactured by National Semiconductor Corporation. After sufficient samples have been accumulated for a character period, the samples are processed in a fast Fourier transform (FET) 54 to produce output amplitudes at each of 64 frequencies. An algorithm processes the three symbol repetitions and selects the one having the largest summed power level as the output symbol. The symbols detected by the FFT 54 are assembled into twenty-character messages by the microprocessor 50 and displayed by the output terminal 40.

Figure 8:
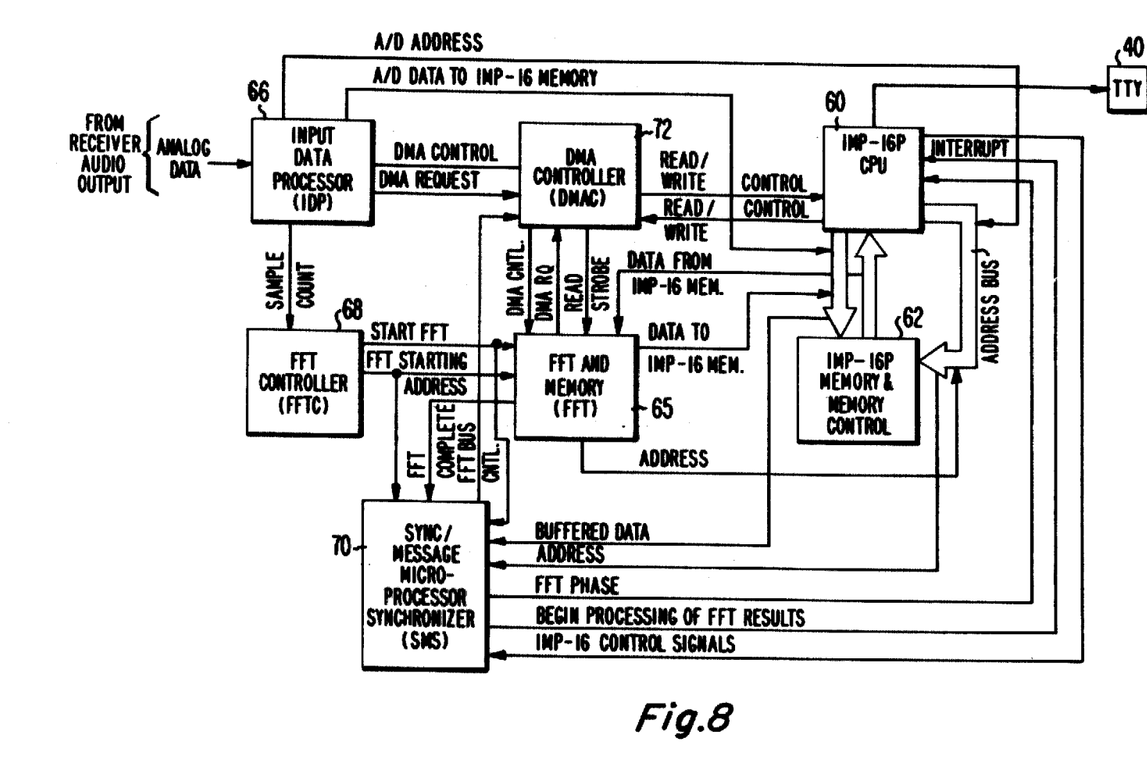
FIG. 8 is a diagram showing the signal paths in the 64-tone demodulator of FIG. 7.

The signal flow in the demodulator of FIG. 7 is shown in FIG. 8. The central processor unit (CPU) of the microprocessor is shown at 60, and the memory and memory control portion of the microprocessor is shown at 62. The fast Fourier transform (FFT) and the memory to store the partial results are shown at 65. The FFT 65 receives 256 data samples and produces sixty-four discrete power density spectral components spaced 37.5 Hz apart in the frequency range of 300 to 2662.5 Hz. An input data processor (IDP) 66 performs the analog-to-digital conversion and requests a direct memory access (DMA) transfer of the samples. The FFT 65 is controlled by a controller 68 a sync/message synchronizer (SMS) 70 and a direct memory access controller (DMAC) 72. The SMS 70 synchronizes the operation of the microprocessor software with the peripheral hardware. Fast Fourier transforms are computed at the rate of three per symbol. When the microprocessor correlates the received sync bursts against its reference and determines that synchronization has occurred, it also determines which FFT output (Phase 0, 1, or 2) caused the correlation. Direct memory access (DMA) is a method of reading or writing data into memory independent of software program control. The direct memory access is completely transparent to the software with no reduction in processing speed, since the DMA function only occurs when the microprocessor memory address and data bus are not being used by the CPU 60.

Figure 9:
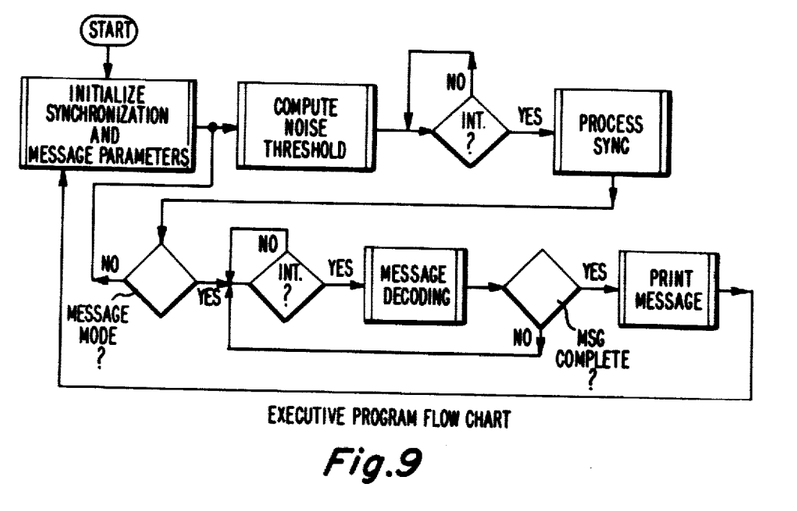
FIG. 9 is a flow chart of an executive program useful in the demodulator of FIG. 8.

A flow chart of the executive program for the demodulator of FIG. 8 is shown in FIG. 9. The program has three states: initialization, synchronization and message processing. The repetitive part of the initialization routine clears the buffers and resets the flags from the previous message. Basic initialization also includes setting up the programmable parameters that make up the message structure. Synchronization and message processing are interrupt-driven algorithms. These interrupts are generated by the FFT controller 68 instructing the CPU that new FFT values are ready for processing.

Figure 10:
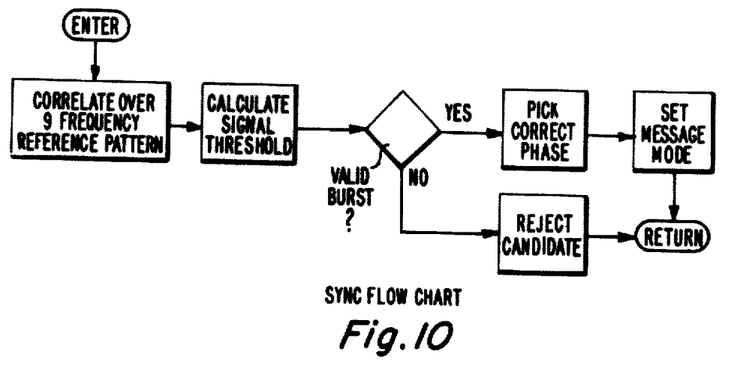
FIG. 10 is a flow chart of an algorithm in the demodulator of FIG. 8 for recognizing received synchronizing bursts.

A flow chart for the synchronization algorithm is shown in FIG. 10. Acquisition of sync is accomplished by correlating the FFT outputs during every phase against the known references of the nine sync frequencies. In the processing of messages, an encoded message arrives in the form of three scrambled message bursts. Each message burst contains a reorganization of the same set of 20 characters that composed the initial message. As each message symbol arrives, the FFT 65 produces the power density contained in each of the sixty-four possible symbol frequencies and stores these as a 64-word vector in the processor memory. For each message symbol, the five frequencies containing the largest power densities are selected. The six-bit character codes represented by these frequencies along with the corresponding power contents are stored in the message inputs vector. The actual position (1 to 20) of this symbol in the 20 character message is then determined based on the transmitted sequence shown in Table II.

The five character codes and power values are then loaded into the appropriate symbol row (1 through 20) in the summation matrix. The summation matrix contains 20 rows, one for each symbol location in the final message. Each row receives 15 character codes and amplitudes, five from each message repetition. The power densities of like character codes within a row are summed together and stored as a single entry.

Thus, upon processing of all three message bursts, the summation matrix rows each contain from 5 to 15 character choices and amplitudes. The character from each row with the largest total power density is then selected and these characters are printed as the final message.

The fast Fourier transform system included in the demodulator of FIGS. 7 and 8 may be replaced by a system for frequency discrimination described in application Ser. No. 052,733 filed on June 28, 1979 for a "System and Method For Frequency Discrimination," by the same inventor and assignee as the present application.

A modem according to the invention for half duplex operation may be implemented by a single processor which performs the functions of both the modulator 12 and the demodulator 38 in FIG. 1.

In the example of the invention which has been described, each one of the 64 alpha-numeric symbols is transmitted in the form of a respective one of 64 fixed-audio-frequency tones. According to another example to be described, each one of the 64 alpha-numeric symbols is transmitted in the form of a respective one of 64 differently-modulated or differently-varying audio-frequency signals. In a preferred arrangement, each one of the 64 signals in the audio frequency range is unidirectionally phase shift keyed by a different 64-bit pseudo-random number. Each resulting one of the 64 signals may then have frequency components in a range from 300 Hz to 3200 Hz with a bell-shaped curve peaking at about 1900 Hz.

Figure 11:
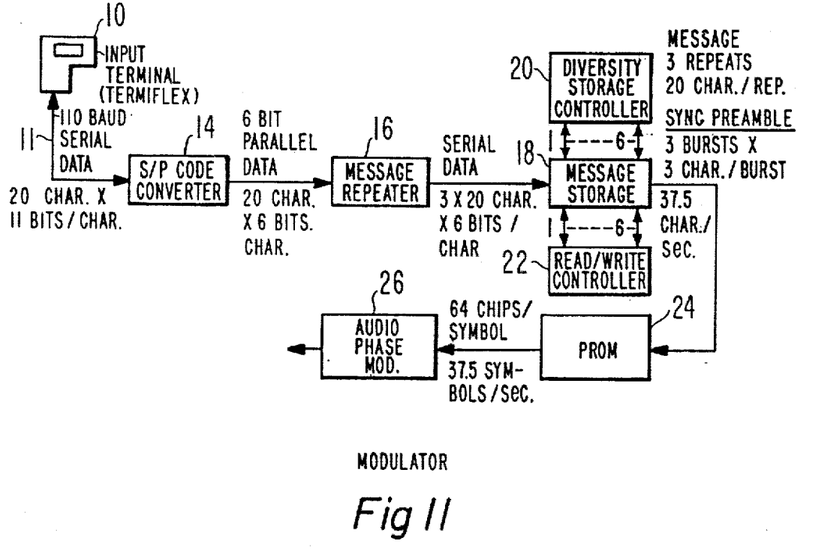
FIG. 11 is a diagram of a modulator producing 64 differently-phase-modulated audio-frequency signals.
Figure 12:
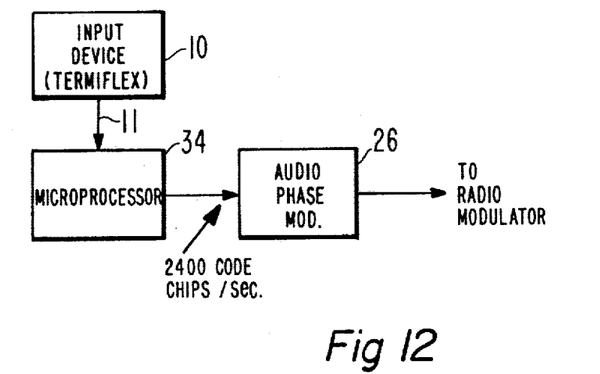
FIG. 12 is a diagram of an alternative modulator producing 64 differently-phase-modulated audio-frequency signals.

A system in which 64 differently-modulated audio-frequency signals are employed is construction the same as the 64-tone system shown in FIGS. 1 through 10 except that a different signal modulator, and a different signal demodulator, are substituted for units shown in FIGS. 5 and 6, and FIGS. 7 and 8, respectively. In FIG. 11, a programmable read only memory 24 is constructed to translate each 6-bit signal from message storage unit 18 to a corresponding one of 64 64-bit (or 64-chip) pseudo-random numbers. Each number from the PROM 24 is applied to an audio phase modulator 26 which may be a unidirectional phase shift keying modulator of the type described in FIG. 1 of U.S. Pat. No. 4,130,802 issued on Dec. 19, 1978, to E. J. Nossen et al. on a "Unidirectional Phase Shift Keyed Communications System." FIG. 12 is different from FIG. 6 in that the units 25 and 28 in FIG. 6 also are replaced by an audio phase modulator 26 according to FIG. 1 of the aforesaid U.S. Pat. No. 4,130,802.

The demodulator in a system employing 64 differently-modulated audio-frequency signals also is constructed differently from the demodulator shown in FIGS. 7 and 8. That is, the received signals may be applied to a demodulator as shown in FIG. 2 of U.S. Pat. No. 4,130,802 (supra) to translate each received phase-modulated signal to a corresponding one of 64 pseudo-random numbers in 64-bit binary form. The output of the patented demodulator is then applied to any suitable correlator which is appropriate to use in place of the fast Fourier transform (FFT) included in FIGS. 7 and 8. A correlator is a well-iknown unit, and in the present system is simply a system for comparing a received 64-bit pseudo-random number with the 64-bit numbers representing 64-respective alpha-numeric symbols to determine which one it is. A received number may be compared simultaneously with all 64 possibilities, or may be compared sequentially with all possibilities. The latter arrangement uses less hardware than the former, and is fast enough for real-time operation in the system described.

The use of 64 distinctly unidirectionally phase shift keyed audio-frequency signals representing the 64 alpha-numeric characters, in place of 64 different fixed frequency signals, provides superior reliability in the presence of natural and man-made interference in applications not involving multi-path transmission problems, and provides superior security against message decoding by adversaries.

What is claimed is:

1. In a data communications system, the combination of
   means to generate a synchronizing signal consisting of a plurality of time-spaced bursts where each burst consists of a plurality of multi-bit symbols in time sequence,
   a source of a message signal consisting of about twenty multi-bit symbols in time sequence,
   means to translate said message symbols to a plurality of time-spaced bursts of the same message symbols, said message symbols following said synchronizing symbols and having a fixed time relationship therewith, and
   means to translate said multi-bit symbols in the synchronizing signal bursts and in the message signal bursts to corresponding audio-frequency signals for transmission.

2. The combination of claim 1 wherein said plurality of synchronizing bursts is three in number and said plurality of message bursts is three in number.

3. The combination of claim 1 wherein said source of a message signal comprises means for producing six bit signals which represent sixty-four respective alpha-numeric symbols and can be translated to sixty-four respective audio-frequency signals.

4. The combination of claim 1 wherein said means to translate said message multi-bit symbols is constructed to produce a plurality of message bursts of the same message symbols with symbols in each burst in a different pseudo-random order.

5. The combination of claim 1 wherein said means to generate a synchronizing signal is constructed to produce bursts each having nine different multi-bit symbols.

6. The combination of claim 1 wherein said means to translate said message symbols is constructed to produce about three bursts of the same message symbols with symbols in each burst in a different pseudo-random order, and wherein said means to generate a synchronizing signal is constructed to produce about nine different multi-bit symbols.

7. The combination of claim 1 wherein said synchronizing signal bursts and said individual message signal bursts are time-spaced the same time amount as the duration of the individual message bursts.

8. The combination of claim 1, and in addition,
   synchronizer means to recognize audio-frequency signals corresponding with said synchronizing symbols, and
   decoder means enabled and synchronized by said synchronizer means to translate received audio-frequency message symbols back to multi-bit message symbols.

9. A data communications system for transmitting and receiving a large number of audio-frequency signals each representing a respective symbol, comprising
   means to generate a synchronizing sequence consisting of a plurality of about three time-spaced bursts where each burst consists of a plurality of about three audio-frequency signals in time sequence,
   means to generate an information signal sequence consisting of a plurality of about three time-spaced bursts where each burst consists of a plurality of about twenty audio-frequency signals in time sequence, each audio-frequency signal corresponding with a respective alpha-numeric symbol, and
   means to transmit said information sequence following said synchronizing sequence and in fixed time relationship therewith.

10. A system according to claim 9 wherein said means to generate a synchronizing sequence generates a plurality of about nine synchronizing audio-frequency signals which are all different.

11. A system according to claim 9 wherein said means to generate an information signal sequence generates the same twenty audio-frequency signals in the three bursts of information signals.

12. A system according to claim 11 wherein said means to generate an information signal generates the same twenty audio-frequency signals in the three bursts in different pseudo-random orders in the three bursts.

13. A system according to claim 9, and in addition,
   synchronizer means to recognize said synchronizing sequence, and
   decoder means enabled and synchronized by said synchronizer means to decode said information signal sequence.

14. A system according to claim 9 wherein inband frequency diversity is provided by a construction of said means to generate an information sequence making the audio-frequency signal of each symbol in the second and third message burst progressively different from what it is in the first message bursts.

15. The invention as claimed in any one of claims 1, 2, 3, 4, 5, 6, 7, 8, 9, 10, 11, 12, 13 and 14 in which said audio-frequency signals are signals of sixty-four different fixed audio-frequencies.

16. The inventions as claimed in any one of claims 1, 2, 3, 4, 5, 6, 7, 8, 9, 10, 11, 12, 13 and 14 in which said audio-frequency signals are signals of sixty-four different changing audio-frequency signals.

17. The inventions as claimed in any one of claims 1, 2, 3, 4, 5, 6, 7, 8, 9, 10, 11, 12, 13 and 14 wherein said audio-frequency signals are unidirectionally phase shift keyed signals.

* * * * *